United States Patent [19]

Budzich et al.

[11] 4,332,677

[45] Jun. 1, 1982

[54] PROCESS FOR RECLAIMING COMPOSITE MATERIALS

[75] Inventors: Mieczyslaw Budzich, Lexington; Forest G. Fitz, Jr., West Columbia, both of S.C.

[73] Assignee: Nassau Recycle Corporation, Staten Island, N.Y.

[21] Appl. No.: 202,283

[22] Filed: Oct. 30, 1980

[51] Int. Cl.³ .............................................. B03B 1/02
[52] U.S. Cl. ........................................ 209/3; 209/11; 209/17; 209/173
[58] Field of Search ................... 209/11, 172, 173, 3; 241/17, 20, 23, 24; 134/5, 25.1, 30, 36, 40; 210/773

[56] References Cited

U.S. PATENT DOCUMENTS

| 505,416 | 9/1893 | Bell | 209/173 X |
| 1,905,945 | 4/1933 | Machen | 209/11 X |
| 2,426,398 | 8/1947 | Lathrop | 209/173 |
| 2,764,289 | 9/1956 | Scheid | 209/173 |
| 3,074,653 | 1/1963 | Schorsch | 241/60 X |
| 3,582,004 | 6/1971 | Lenz et al. | 241/20 X |
| 3,976,563 | 8/1976 | Scalco | 209/3 |
| 4,097,306 | 6/1978 | Carman | 134/10 |
| 4,173,493 | 11/1979 | Kallas | 134/11 |
| 4,216,369 | 8/1980 | Burtelson | 134/5 X |

Primary Examiner—Ralph J. Hill
Attorney, Agent, or Firm—Robert B. Kennedy

[57] ABSTRACT

A process for reclaiming composite materials that includes viscous and non-viscous constituents is described. The process comprises the steps of submerging the materials in a bath of liquid having a specific gravity greater than the viscous constituent but less than the non-viscous constituent, blasting the submerged materials with a gas or vapor heated to a temperature in excess of the melting temperature of the viscous constituent whereupon the viscous constituent is liberated from the non-viscous constituent and rises to the surface of the bath, skimming the viscous constituent from the surface of the bath, and emerging the non-viscous constituent from the bath.

14 Claims, 4 Drawing Figures

PROCESS FOR RECLAIMING COMPOSITE MATERIALS

TECHNICAL FIELD

This invention relates to processes for reclaiming composite materials of the types that includes both relatively viscous and non-viscous constituents.

BACKGROUND OF THE INVENTION

Composite materials are sometimes comprised of both viscous and non-viscous constituents. For example, some telecommunication cables are filled with petroleum jelly or an extended thermoplastic rubber as a waterproofing measure. The presence of such viscous or jelly-like substances has however inhibited their reclamation. With telecommunication cables, for example, reclamation of those without jelly may be readily accomplished through the use of choppers and air gravity tables. These devices respectively liberate plastic insulation from the metallic conductors and separate the cable sheathing and conductors from each other and from the liberated insulation. With the inclusion of a viscous, jelly-like substance, however, both liberation and separation of the components is severly restricted since the jelly tends to adhere the various constituents together and to the processing equipment.

Recently, efforts have been made to devise a system for reclaiming jelly bearing telecommunication cables. One such approach has been the inclusion of a dry additive such as clay to absorb the jelly and form a mass of dry particles that may be reclaimed as before by chopping and air gravity table separation. Unfortunately, this approach has been impractical and cost inefficient due to the need for another material merely to serve as a transport medium in the reclamation process. The presence of clay has also created dust pollution and equipment wear.

Accordingly, there remains a need to provide an effective and efficient process and apparatus for reclaiming composite materials of the type that includes relatively viscous and non-viscous constitutents. It is to this task to which the present invention is primarily directed.

SUMMARY OF THE INVENTION

In one preferred form of the invention a process is provided for reclaiming composite materials that include viscous and non-viscous constituents. The process comprises the steps of submerging the materials in a bath of liquid having a specific gravity greater than the viscous constituent but less than the non viscous constituent. The submerged materials are blasted with a gas or vapor heated to a temperature in excess of the melting temperature of the viscous constituent whereupon the viscous constituent is liberated from the non-viscous constituent and rises to the surface of the bath. The viscous constituent is skimmed from the surface and the non-viscous constituent removed from the bath.

In another form of the invention a process is provided for reclaiming jelly filled telecommunications cable. The process comprises the steps of segmenting the cable into jelly bearing segments of insulation covered wires, submerging the segments in a bath of liquid having a specific gravity greater than the jelly but less than the wires, blasting the submerged segments with a gas or vapor heated to a temperature in excess of the melting temperature of the jelly whereupon jelly is liberated from the segments and rises to the surface of the bath, and skimming the jelly from the bath surface.

In another preferred form of the invention a process is provided for reclaiming jelly filled telecommunication cables which comprises the steps of chopping the cable into jelly bearing segments of insulation covered wires, feeding the segments into a bath of liquid having a specific gravity greater than the jelly but less than the wires and onto a conveyor submerged within the bath, conveying the segments along a submerged path past a succession of steam jets whereupon jelly is liberated from the segments and rises to the surface of the bath, skimming the surface of the bath to remove the jelly therefrom, and removing the segments from the bath.

In yet another preferred form of the invention apparatus is provided for reclaiming composite materials that includes relatively viscous and non-viscous constituents. The apparatus comprises a bath of liquid having a specific gravity greater than the viscous constituent but less than a non-viscous constituent. Means are provided for conveying the materials along a path submerged in the bath. Means are also provided for blasting materials being conveyed along the submerged path with a gas or vapor heated to a temperature in excess of the melting temperature of the viscous constituent to liberate the viscous constituent from the non-viscous constituent and enable the viscous constituent to rise to the bath surface. Means are further provided for skimming the liberated viscous constituent from the surface of the bath.

DETAILED DESCRIPTION

Figure 1:
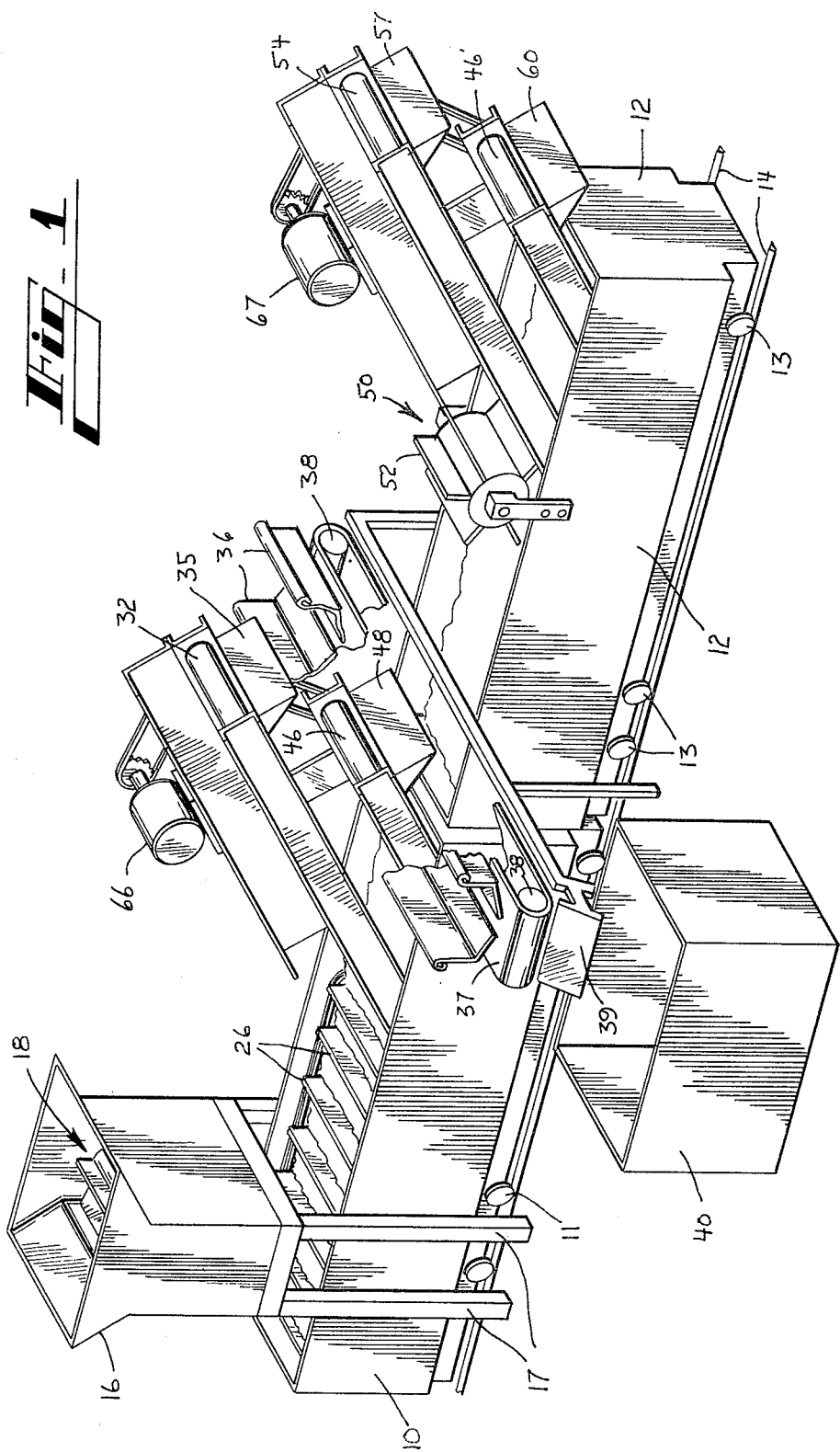
FIG. 1 is a perspective view of apparatus embodying principles of the invention which may be used in practicing processes of the invention.

Referring now in more detail to this drawing there is shown apparatus for reclaiming jelly bearing materials which comprises two open top tanks 10 and 12 supported in tandem by their wheels 11 and 13 respectively upon rails 14. A hopper 16 is supported over one end of tank 10 by a set of upright legs 17. For purposes of illustration the hopper is shown with an open top but actually is shrouded about an ancilliary conveyor. A granulator 18 is mounted in the hopper above the open top tank 10 above a screen 19. The granulator conventionally comprising a set of blades 20 mounted upon a motor driven rotor 21.

Within the tank 10 is mounted a skimmer generally indicated at 25 which comprised of a set of mutually spaced skimming blades or paddles 26 attached to two, laterally spaced chains 27 for movement along an endless path passing over sprockets 28 and 29. These sprockets, which may be driven by a motor 66, are mounted at a level within the tank to cause the upper members of the set of paddles 26 shown in FIG. 2 to pass through the surface 30 of the body of liquid housed within the tank. This surface is maintained at or above a minimum level such as to insure that at least some portion of the paddles skim the surface as they move along the path illustrated. The skimmer also includes an endless belt 32 movably supported on a pulley 33 located within the tank adjacent sprocket 29 and another pulley which is located above the tank. The pulley 33 is positioned so as to enable the paddles 26 to pass closely adjacent to it as they round sprocket 29 so that materials skimmed by the paddles 26 are driven onto the endless belt 32 then to be emerged from the tank. Jelly-like, viscous material conveyed upwardly by the belt 32 out of the tank is then gravity fed onto a chute 35 shown in FIG. 1 which, in conjunction with shrouds 36, guide the material onto a transversely oriented conveyor belt 37 driven along a generally horizontal path over rollers 38. The jelly-like material on belt 37 is finally gravity fed down another chute 39 and into a collection bin 40.

Figure 2:
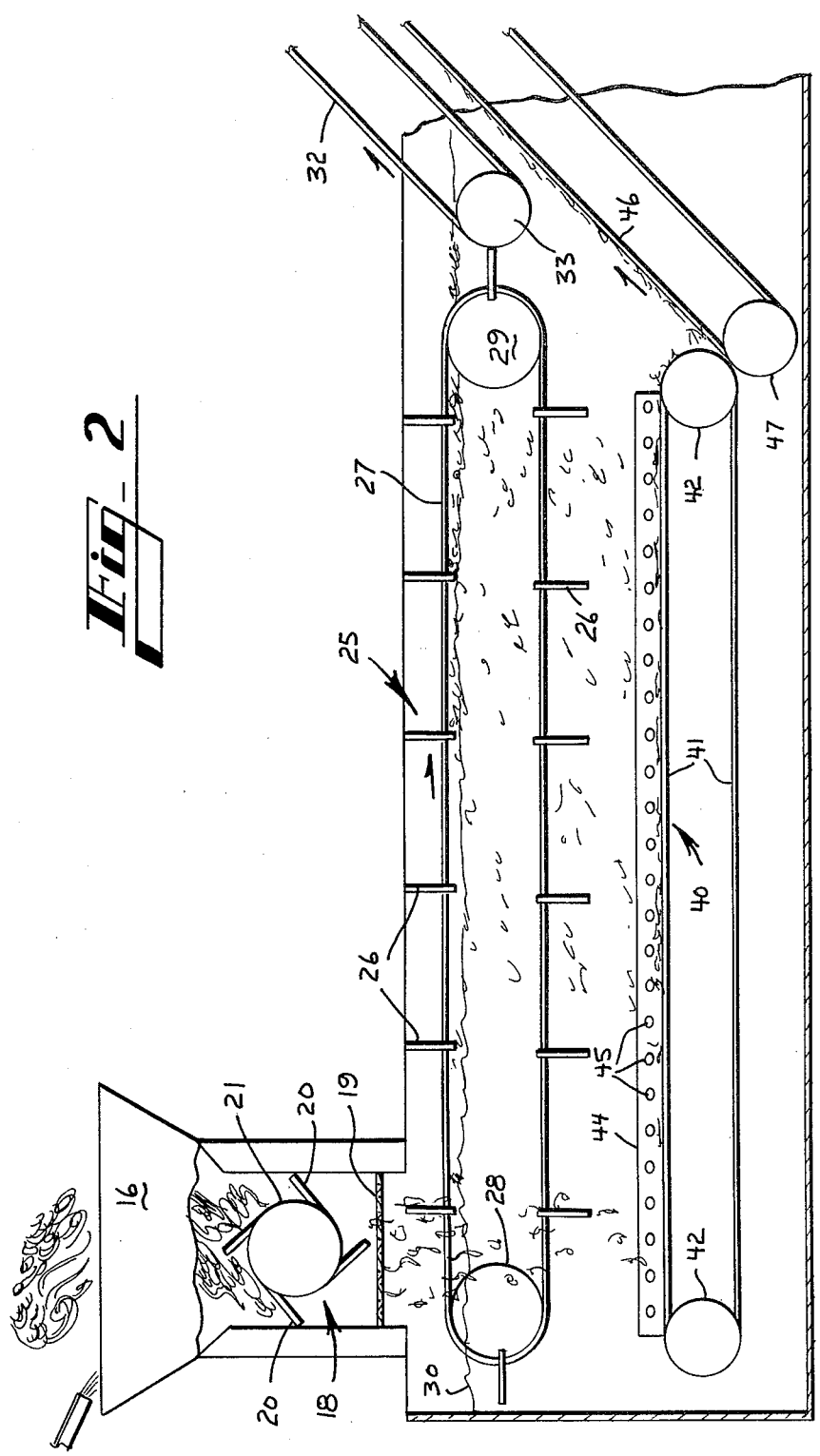
FIG. 2 is a side elevational view of an internal portion of the apparatus shown in FIG. 1.
Figure 4:
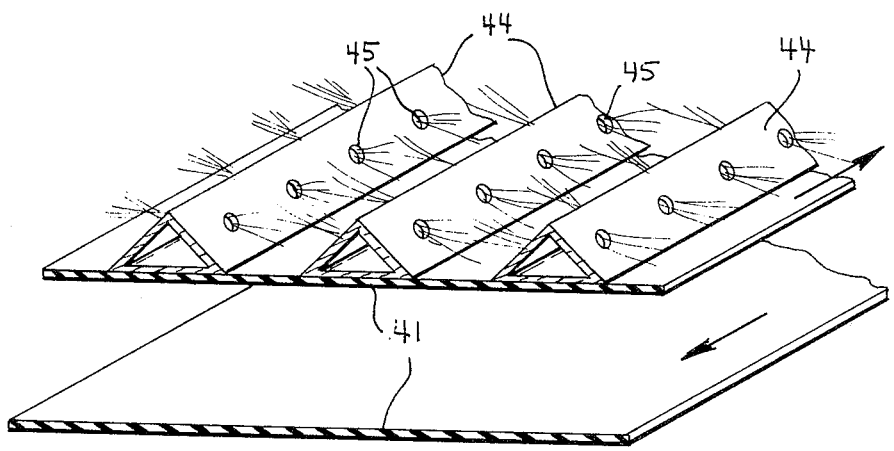
FIG. 4 is a perspective view of a lower portion of the apparatus illustrated in FIG. 2.

With particular reference to FIGS. 2 and 4 the apparatus is further seen to include a steam separator shown generally at 40 which includes a conveyor belt 41 mounted for movement along an endless path passing over pulleys 42 submerged beneath the surface 30 of the body of liquid housed within the tank and the skimmer 25. The steam separator includes a manifold having a plurality of conduits 44 of triangular cross-sectional shape mounted within the tank 10. This manifold is placed by unshown means in fluid communication with a steam generator located externally of the tank. The conduits are mounted within the tank at a level just above the path of the conveyor belt 41 as best shown in FIG. 4. The steam separator also includes another conveyor belt 46 that passes over a pulley 47 located aside and below the pulley 42 in order to collect sink materials having a specific gravity greater than the ambient liquid as they gravitate off of belt 41 in rounding pulley 42. The belt 46 is driven along an endless path that emerges out of the tank 10 and over a chute 48 positioned over the open top tank 12.

Figure 3:
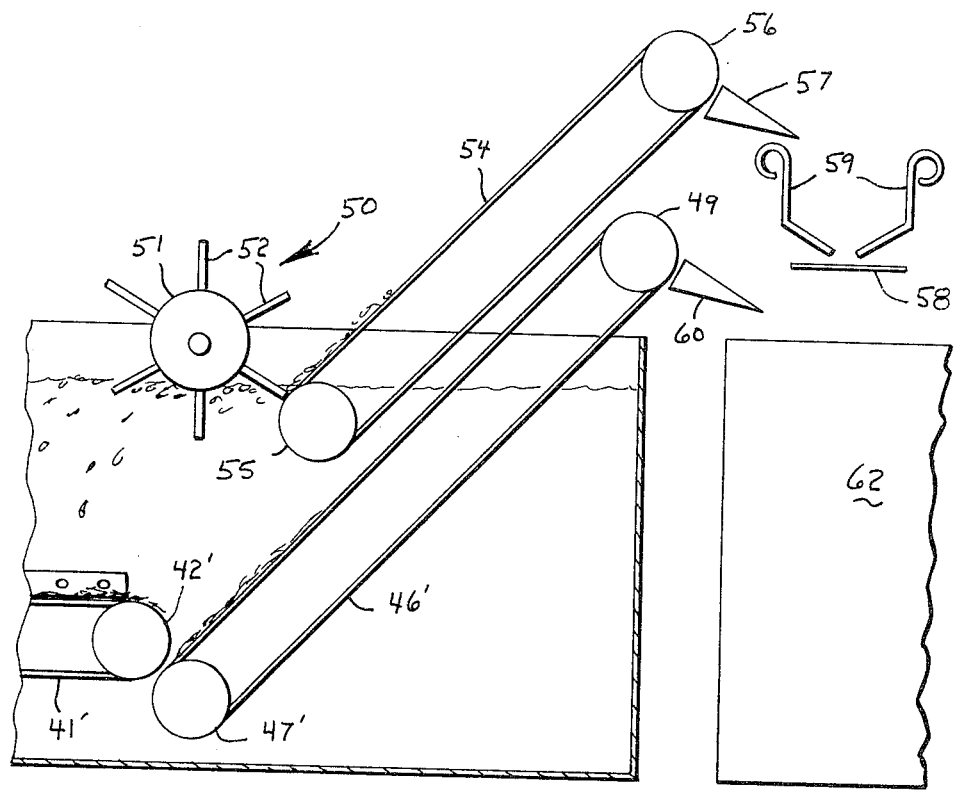
FIG. 3 is a side elevational view of another internal portion of the apparatus shown in FIG. 1.

With reference again to FIG. 1 the apparatus is seen to include a second tank 12 located in tandem with the first tank for the purpose of performing a second operation for thoroughness of materials separation. The tank 12 may house the same type of skimmer and steam separator as that housed within the tank 10. In the case illustrated however the skimmer is shown to be of an alternative construction in the form of a paddle wheel 50 having a hub 51 from which a plurality of paddles or blades 52 radiate. As also shown in FIG. 3 the paddle wheel is located adjacent a conveyor belt 54 driven by a motor 67. The belt is looped about a pulley 55 that is submerged within the bath of liquid contained within the tank just beneath the circular path of travel of the paddle wheel blades. The belt is driven along an endless path that emerges out of the tank and is looped over another pulley 56 located adjacent a chute 57. This chute, as shown in FIG. 3, is located above a transverse conveyor belt 58 located beneath a pair of elongated shrouds 59 that convey floating, viscous materials to an unshown collection bin.

Within the tank 12 is also mounted another steam separator of the same construction as that previously described. The separator has a conveyor belt 41' routed about a pulley 42' from which sink materials are conveyed onto another conveyor belt 46' that is routed around a submerged pulley 47' and an emerged pulley 49. Another chute 60 is mounted beneath the pulley 49 which guides the sink materials into another collection bin 62. An electric motor 67 drives the conveyor belts associated with the tank 12 liberation and separation process through partially unshown power train means.

In use the tanks 10 and 12 are filled with a liquid having a specific gravity greater than the jelly component of the materials to be separated but less than other, relatively non-viscous components of the materials. For example, water may be used to separate telecommunication cables comprised of metals such as copper which form electrical signal conductors and steel or aluminum which form protective sheathing material, petroleum jelly waterproofing material, and polyethylene for conductor insulation and cable jacketing material. With the tanks filled the various conveyors, the chopper, the steam separator and skimmers are all energized. The cable may then be fed into the hopper 16 whereupon the chopper 18 chops it into segments. The segments then are forced by the chopper blades downwardly upon screen 19. Those segments which have been chopped into a size small enough to pass through the screen interstices then gravitate into the bath of liquid housed within the tank 10. This may include small amounts of insulation liberated from the cable wires by the chopper which then float on the surface of the bath. Those segments which have not yet been reduced to such a size are thrown upward by the chopper blades 20 to be chopped again and again until they are sufficiently small to pass through the screen. In selecting the size of the screen a tradeoff is inherently involved. Specifically, the greater the size of the interstices the faster the operation will proceed but the smaller the percentage of liberation of insulation. Conversely, the smaller the interstices the slower the operation but the greater the yield of liberated metal.

As the segmented material enters the water it sinks between the skimmer blades 26 and their chain drive down onto the conveyor belt 41. The material is then conveyed to the right as viewed in FIG. 1 passing between the various conduits 44. As this occurs steam at a temperature of some 300° F. to 350° F. and pressure of some 65 to 135 psi exits the conduit orifices 45 and blasts the material. This causes the petroleum jelly to attain its melting temperature and to be liberated from the metallic and plastic components of the segments. This is done by the combination of high temperature and agitation provided by the steam which melts and shakes loose the jelly. As this occurs the water in which the steam is released serves as a transport medium enabling the liberated jelly to rise to the surface of the bath since the specific gravity of the water is greater than that of the jelly. The long passage of of the materials upon the belt 41 pass the numerous orifices of the elongated conduits 44 ensures that a substantial percentage of the jelly will have been liberated from the material segments by the time the belt reaches the pulley 42. From here the sink material segments are dumped onto the conveyor belt 46 and transported out of the tank. At the same time the floating jelly is swept to the right by the paddle blades 26 of the skimmer and onto the belt 32 which lifts it out of the tank.

After the jelly has emerged from the tank 10 it is deposited on and gravitates down chute 35, between shrouds 36, and onto the conveyor belt 37 which delivers it to the collection tub 40. After the sink materials, including metal and some insulation, are emerged they are dumped down chute 48 and into the other tank 12 where the separation and liberation process is repeated. Jelly liberated within the tank 12 is skimmed by the paddle wheel 50 onto belt 54 and then down chute 57 into another collection tub for the float materials. The sink materials, now substantially freed of jelly, are emerged from tank 12 by belt 46' and guided into a collection bin 62 by chute 60. A dewatering screen, not shown, may be employed here to remove water from the materials. The water so removed is then pumped back to the tank 10. Though a paddle wheel type skimmer is employed here, a skimmer of the same type as that shown in tank 10 could, of course, again be used.

It thus is seen that processes and apparatuses are provided for reclaiming composite materials in an effective and efficient manner. It should however be understood that the just described embodiments merely illustrate principles of the invention in selected, preferred forms. Many modifications, additions and deletion other than those specifically suggested may be made thereto without departure from the spirit and scope of the invention as set forth in the following claims.

What is claimed is:

1. A process for reclaiming jelly filled telecommunications cable comprising the steps of:
   a. segmenting the cable into jelly bearing segments of insulation covered wires;
   b. submerging the segments in a bath of liquid having a specific gravity greater than the jelly but less than the wires;
   c. blasting the submerged segments with a gas or vapor heated to a temperature in excess of the melting temperature of the jelly which gas or vapor blasting directly agitates the segments and melts the jelly whereupon jelly is liberated from the segments and rises to the surface of the bath; and
   d. skimming the jelly from the bath surface.

2. A process for reclaiming telecommunications cable in accordance with claim 1 wherein step (a) the cable is chopped into segments.

3. A process for reclaiming telecommunications cable in accordance with claim 1 or 2 wherein step (a) at least some of the insulation is liberated from the wires.

4. A process for reclaiming telecommunications cable in accordance with claim 3 wherein the liquid has a specific gravity greater than the insulation, and wherein insulation liberated from the wires in step (a) is gravity fed into the bath then to float on the bath surface, and wherein step (d) the liberated insulation is also skimmed from the bath surface.

5. A process for reclaiming telecomunications cable in accordance with claim 1 wherein step (c) the submerged segments are conveyed through the bath while being repeatedly blasted with a gas or vapor.

6. A process for reclaiming telecommunications cable in accordance with claim 1 wherein said liquid is aqueous and wherein step (c) the submerged segments are blasted with steam.

7. A process for reclaiming telecommunications cable in accordance with claim 1 further comprising the steps of (e) removing the cable segments from the bath.

8. A process for reclaiming jelly filled telecommunications cable comprising the steps of:
   a. chopping the cable into jelly bearing segments of insulation covered wires;
   b. feeding the segments into a bath of liquid having a specific gravity greater than the jelly but less than the wires and onto a conveyer submerged within the bath;
   c. conveying the segments along a submerged path through a succession of steam jets that agitate the segments and melt the jelly and thereby liberate jelly from the segments whereupon the liberated jelly rises to the surface of the bath;
   d. skimming the surface of the bath to remove the jelly therefrom; and
   e. removing the segments from the bath.

9. A process for reclaiming jelly filled telecommunications cable in accordance with claim 8 wherein the bath liquid has a specific gravity greater than the insulation, wherein step (a) some of the insulation is liberated from the wires, in step (b) the liberated insulation is also fed into the bath, and in step (d) the liberated insulation is also skimmed from the bath surface.

10. Apparatus for reclaiming composite materials that include relatively viscous and non-viscous constituents which apparatus comprising a bath of liquid having a specific gravity greater than the viscous constituent but less than the non-viscous constituent; means for conveying the materials along a path submerged in said bath; means for blasting materials being conveyed by said conveying means along said submerged path with gas or vapor heated to a temperature in excess of the melting temperature of the viscous constituent sufficiently to agitate and thereby liberate the viscous constituent from the non-viscous constituent and enable the viscous constituent to rise to the liquid body surface; and means for skimming the liberated viscous constituent from the surface of the bath.

11. Apparatus for reclaiming composite materials in accordance with claim 10 wherein said conveying means includes a conveyor belt mounted for movement along said path, and wherein said blasting means includes a manifold having a succession of outlets located to each side of said path.

12. Apparatus for reclaiming composite materials in accordance with claims 10 or 11 wherein said skimming means includes a plurality of mutually spaced paddles coupled together for movement along a circuitous path passing above said conveyor means.

13. Apparatus for reclaiming composite materials in accordance with claim 10 or 11 wherein said skimming means includes a paddle wheel mounted for rotation about an axis located above said path adjacent said surface level.

14. Apparatus for reclaiming composite materials in accordance with claim 10 further comprising means for removing materials blasted along said path out of the body of liquid.

* * * * *